(12) United States Patent
Lu et al.

(10) Patent No.: US 9,047,486 B2
(45) Date of Patent: Jun. 2, 2015

(54) METHOD FOR VIRTUALIZING A PERSONAL WORKING ENVIRONMENT AND DEVICE FOR THE SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 820 days.

(21) Appl. No.: 13/286,520

(22) Filed: Nov. 1, 2011

(65) Prior Publication Data

US 2012/0047503 A1 Feb. 23, 2012

Related U.S. Application Data

(62) Division of application No. 12/099,821, filed on Apr. 9, 2008.

(30) Foreign Application Priority Data

Jun. 8, 2007 (CN) .......................... 2007 1 0100374

(51) Int. Cl.
*G06F 7/04* (2006.01)
*G06F 21/62* (2013.01)
*G06F 9/455* (2006.01)
*G06F 21/34* (2013.01)

(52) U.S. Cl.
CPC ........ *G06F 21/6245* (2013.01); *G06F 9/45537* (2013.01); *G06F 21/34* (2013.01); *G06F 2221/2149* (2013.01)

(58) Field of Classification Search
USPC ............................. 726/26; 705/16, 21, 59, 71
See application file for complete search history.

(56) References Cited

U.S. PATENT DOCUMENTS

| | | | |
|---|---|---|---|
| 2003/0194085 A1* | 10/2003 | Dillaway | 380/29 |
| 2003/0231220 A1* | 12/2003 | Sase et al. | 345/864 |
| 2006/0245742 A1 | 11/2006 | Ashley et al. | |
| 2006/0265711 A1 | 11/2006 | Bantz et al. | |
| 2007/0076870 A1 | 4/2007 | Takashima et al. | |
| 2007/0271561 A1* | 11/2007 | Winner et al. | 718/1 |
| 2007/0288224 A1 | 12/2007 | Sundarrajan et al. | |

* cited by examiner

*Primary Examiner* — Dante Ravetti
(74) *Attorney, Agent, or Firm* — Hammer & Associates, P.C.

(57) ABSTRACT

The present invention is directed to a method for virtualizing a personal working environment and a device for the same, relating to the information security field. The method comprises the steps of: installing a Virtual Machine (VM) environment on a device; upon virtualizing the personal working environment, connecting the device to a host, loading the VM environment into the host; and responding to a user operation and saving data of the user operation to the device by the VM environment. The device comprises a communication interface module, a VM environment storage module, and a control module. The present invention provides a means for secure and convenient mobile work.

4 Claims, 3 Drawing Sheets

METHOD FOR VIRTUALIZING A PERSONAL WORKING ENVIRONMENT AND DEVICE FOR THE SAME

RELATED APPLICATION

This application is a divisional application from co-pending U.S patent application Ser. No. 12/099,821 filed Apr. 9, 2008.

FIELD OF THE PRESENT INVENTION

The present invention relates to the field of information security, and more particularly, to a method for virtualizing a personal working environment and a device for the same.

BACKGROUND OF THE PRESENT INVENTION

As e-business develops fast, working is increasingly dependent on computers and the network in business affairs. And applications, such as MS Office, electronic mailbox, chat tools, and forums, are frequently used for work.

The requirements for security of information boost development of the information security device, which is a portable and removable hardware device. The small-sized information security device contains a processor and a storage unit. It can be connected to a host via a data communication interface of the host. Typically, the processor takes advantage of a security-designed chip, so that the so-called key generation, key security storage, and preset cryptographic algorithms are implemented through its built-in security mechanism. Additionally, sensitive information, like passwords and certificates, can be stored in the information security device to guarantee security or prevent it from being forgotten. Operations relating to keys are fully performed inside the information security device. Moreover, the information security device is an anti-attack device. Generally, the information security device is connected to a host via a USB (Universal Serial Bus) interface, so that the information security device is also called the USB key or the USB token. At this time, the advanced information security device is programmable, in other words, the previously stored code can be executed in the information security device.

In addition to capabilities of common embedded microcontrollers, the security-designed chip also incorporates security. Special processing relating to security is applied to the architecture of the security-designed chip during its design phase. For example, the security-designed chip employs a specific security kernel, which provides supports for multiple states with different right definitions, so as to implement management of access to hardware resources, support for randomization of instruction execution time (i.e. instruction cycle), support for switch of chip states through its interrupt system, so as to implement control over different levels of security to support multi-applications. In addition, the kernel may also contain a MMU (Memory Management Unit) for separating logic addresses from physical addresses and mapping addresses, providing supports for the implementation of application (or multi-applications) and security from the architecture and forming a hardware firewall along with the different states. The interrupt system can also support passing and switching of interfaces and privileges for system databases and user programs. The security-designed chip can be equipped with a non-volatile memory as its storage medium. Generally, the security-designed chip complies with some standards or is certified by authorities to guarantee its security. These standards and certification include, for example, TCG TPM v1.2, ISO15408, and certain standards of China Password Administration Committee. One of the commercially available security-designed chips is ST19WP18 from STMicroelectronics has been successfully certified by EAL5+(Common Criteria Evaluation Assurance Level 5 plus), which is one of the highest levels for this kind of products in ISO15408 standard.

In view of the features of the information security device, the information security device has been widely applied to identity authentication, online banking and VPN (Virtual Private Network) in recent years. The information security device can also be used to encrypt or decrypt data stored in it for the purpose of software protection. In addition, the information security device can be used for the so-called data interaction (encrypting data written in or decrypting data read out), identify authentication information processing, storing/verifying passwords, storing/verifying signatures, storing/verifying certificates, access control, and data operation on preset code, etc. In particular, the preset code may be a preset user software fragment, which cannot be read outside the information security device and can only be operated within the device, and a preset software protection application interface function, which is an interface-level function between the information security device and the software developer application, etc.

CDs, hard disks, and mass storage devices are easy to use with the autorun function. In general, programs that can be executed automatically are called autorun programs. The system is notified of which program is to be executed and which its path is by an autorun program, so that the program is executed automatically. When a CD with an autorun program is inserted into or a mass storage device with an autorun program is connected to a host system, the autorun program will automatically load a relevant file, such as a .exe (executable) file, a .reg (registry) file, a .GIF file, a .HTML file, a .PDF file, etc., because the autorun program contains commands (for changing drive icon, executing a program, etc.) to be executed automatically.

The Virtual Machine (VM) is a virtualized "computer" by its literal meaning. The virtualized "computer" is almost just like a real computer, except that its hard disk is virtualized from within a file. Therefore, the settings of the VM can be modified in any way, without tampering the computer itself. The VM is a system that supports multiple operating systems running in parallel on a single physical server, thus providing more efficient use of lower level hardware. In the VM, the Central Processing Unit (CPU) chip assigns a memory area from other segments of the system and the operating system and applications run in a protected mode. The client operating system and applications can run on the VM, without support by a network adapter.

The working environment herein refers to all application programs and application environments needed in work, such as popular work software like Microsoft Office (including Word, Excel, Powerpoint) and Outlook, chat applications like MSN and QQ, and personal preferences like a browser application, etc.

Generally, people build a personal working environment, set logon passwords for applications, save private files etc. in their computer for carrying out their work. However, it is no longer for this manner to meet the needs now for the security and convenience. When working outside the office or at home, people have to remember many passwords for their mailboxes, or instant communication tools, such as MSN and QQ. And the classic websites cannot be retrieved by the working computer versus the one that is located at the office. Moreover, personal private files or other confidential files cannot be saved securely on computers other than the office computers. It is also possible that personal accounts for applications and associated data of the owner of the accounts and even those of his friends are hacked by hard drive analysis or logging in as Administrator or the owner's role and resetting passwords, on a computer with which the owner does not have full control.

SUMMARY OF THE PRESENT INVENTION

To create a more secure and convenient working environment, the present invention provides a method for virtualizing a personal working environment and a device for the same. The technical solution is as follows:

a method for virtualizing a personal working environment, the method comprising the steps of:

installing a Virtual Machine (VM) environment on a device;

upon virtualizing the personal working environment, connecting the device to a host, and loading the VM environment into the host; and responding to a user operation and saving data of the user operation to the device by the VM environment.

The step of installing the VM environment on the device comprises storing a VM program and a VM data file on the device.

The step of storing the VM program and the VM data file on the device further comprises the step of:

encrypting the VM data file with an encryption algorithm in the device, and storing the encrypted VM data file in the device; and accordingly, loading the VM environment into the host further comprises the step of:

decrypting the encrypted VM data file with a decryption algorithm associated with the encryption algorithm in the device and loading the VM environment into the host with the decrypted VM data file.

Loading the VM environment into the host is conducted through an autorun function.

Before loading the VM environment into the host, the method further includes the step of:

authenticating a user, and allowing the following loading process in response to a positive result, or terminating it in response to a negative result.

After loading the VM environment into the host, the method further includes the step of:

starting a monitor program on the host, and automatically unloading the VM environment if the monitor program detects that the device is disconnected with the host.

The user operation is a mobile work operation.

The device is an information security device, and the user operation is at least one of a mobile work operation and an information security operation.

A device for virtualizing a personal working environment, the device comprising:

a communication interface module for connecting the device with a host;

a Virtual Machine (VM) environment storage module for storing a VM program and a VM data file, and storing data relating to operations performed by a user in a virtualized working environment; and the VM data file comprising virtual operating system parameters; and a control module for controlling communications between the communication interface module and the host, and virtualization of the personal working environment in the host by the VM environment storage module.

The device further comprises an information security module for performing an information security operation under control of the control module.

Specially, the information security module performs an information security operation in the personal working environment virtualized by the control module and the VM environment storage module.

The information security module can be integrated with at least one of the communication interface module, the VM environment storage module and the control module on a chip.

The chip is a security-designed chip which includes a smart card chip.

The device further comprises:

an encryption module for encrypting the VM data file with an encryption algorithm in the device under control of the control module, when the VM environment storage module stores the VM data file; and a decryption module for decrypting the VM data file encrypted by the encryption module with a decryption algorithm relating to the encryption algorithm in the device under control of the control module, before virtualization of the personal working environment by the control module and the VM environment storage module in the host.

The device further comprises:

an autorun module for automatically loading the VM program and the VM data file stored by the VM environment storage module into the host under control of the control module, after the device is connected with the host.

The control module can be integrated with at least one of the communication interface module, the VM environment storage module and the autorun module on a chip.

The device further comprises a monitor module for starting a monitor program to automatically unload the VM environment if the monitor program detects that the device is disconnected with the host under control of the control module after virtualization of the personal working environment by the control module and the VM environment storage module in the host.

The communication interface module comprises at least one of a Universal Serial Bus (USB) interface, an IEEE 1394 interface, a SATA (Serial Advanced Technology Attachment) interface, a Bluetooth interface, an infrared interface, and a Radio Frequency (RF) interface.

The VM environment storage module is a mass storage element.

The VM environment storage module can be integrated with the information security module in a mass storage element.

The VM environment storage module can be integrated with the autorun module in a mass storage element.

The mass storage element is a flash memory, a micro drive, or a smart card.

The device is a key-ring style, handheld, or wrist portable device.

By loading a predetermined VM environment from a device to a host, a preferred personal working environment can be virtualized in different computers, and no operation can be traced in the computers if all user operations are performed in the virtualized working environment. Therefore, the security is increased to the user. In addition, storage of the VM environment in the device eases use of personal working environment and mobile work. If the device is an information security device, all information security associated operations can be applied to the virtualized working environment to improve the security and convenience.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments and the drawings below.
Embodiment 1

Figure 1:
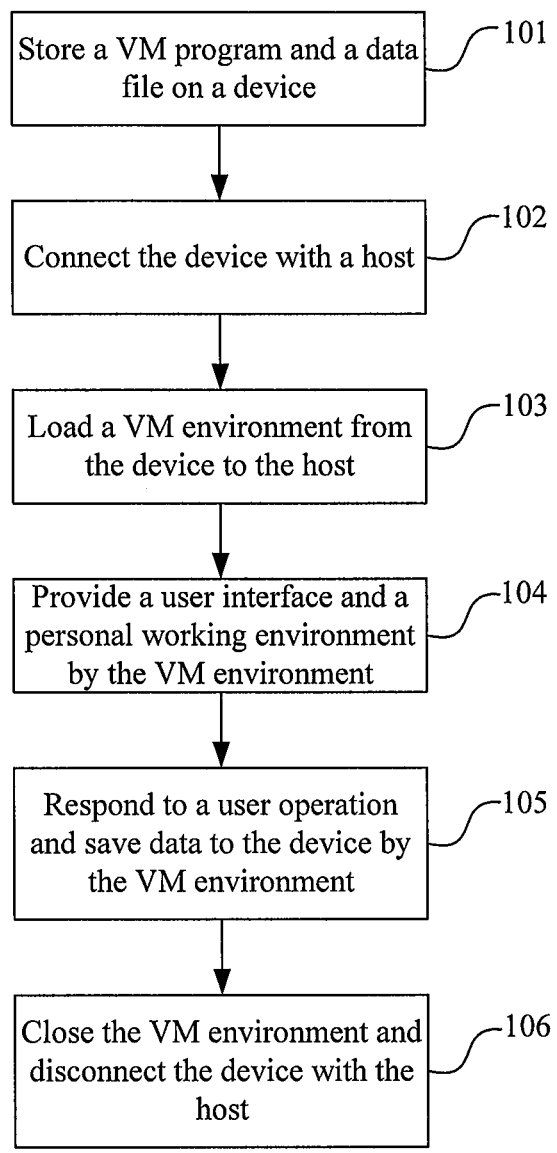
FIG. 1 is a flow diagram of a method for virtualizing a personal working environment in Embodiment 1 according to the present invention.

Referring to FIG. 1, the embodiment provides a method for virtualizing a personal working environment. The method comprises the following steps.

Step 101: Install a Virtual Machine (VM) environment in a device (i.e. store a VM program and a VM data file), and set a VM environment.

Typically, the VM program is an executable program. A VM program relates to one or more VM data files. It is possible to implement several operating systems in a device with several VM data files, if sufficient memory space is available. The VM environment in a device can be set using Vmware, Bochs, and Kqemu etc.

The VM environment can be a VM environment without any operating systems and applications. When it has been loaded into a host, the user will install operating systems and applications as required. In addition, the VM environment can also be a VM environment with basic configurations (e.g. which are set by the developer). In other words, the VM environment can be installed with operating systems, such as Windows 98, Windows 2000, Windows XP, and Linux, with basic applications, such as Microsoft Office (Word, Excel, and Powerpoint, etc.), and/or with a mailing system, such as Foxmail or Outlook, etc.

Step 102: Upon virtualizing a personal working environment, connect the device with a host.

The device can be wiredly connected with the host, for example, through a Universal Serial Bus (USB) interface, an IEEE 1394 interface or a SATA (Serial Advanced Technology Attachment) interface, or wirelessly connected with the host, for example, through a wireless Bluetooth interface, an infrared interface or a Radio Frequency (RF) interface, etc.

Further, the user can be authenticated by the host. The host verifies if the user is the legitimate holder of the device. The PIN (Personal Identity Number) code or biometrics can be used for verifying the user. If the result is positive, the following operations are allowed. Otherwise, they can not be performed.

Step 103: Load the VM environment from the device to the host.

The process of loading the VM environment can be done using an autorun program. In particular, start an autorun program on the host, which automatically parses a VM program and a VM data file previously stored in the device, and loads the VM program in accordance with the virtual operating system parameters in the VM data file to the host. The VM program then runs and starts a VM environment.

Step 104: The VM environment provides a user interface and a personal working environment.

Step 105: The VM environment responds to a user operation and saves data of the user operation to the device.

The user operation can be a mobile work operation, such as installing an application (e.g. a Kingsoft digital dictionary, a music player, Photoshop or QQ), or specially using the application, etc.

The device can be a storage device (e.g. a USB flash disk) or an information security device. If the device is an information security device, the user operation can also be an information security operation. Accordingly, the VM environment can respond to the information security operation. The process of performing an information security operation by a user is the same as on a real computer, except that the operation is performed on the virtual space on the mass storage element of the information security device, and no trail is left on the host for the operation. The information security operations that can be performed in the virtual working environment can be those as follows.

1. A Data Interaction Operation

For example, encryption of data of the user operation or decryption of data of the user operation in the information security device.

2. An Authentication Information Processing Operation

For example, control of user access to a network in the VM environment by verifying the hardware information or user authentication information contained in the information security device; verification or authentication of digital signatures or certificates identifying the file sender in the VM environment to prevent data from being tampered in communication process; verification of legitimacy of logon to a website (e.g. a banking website) from a remote VM environment with a signature; and addition of access control information to certain files to prevent illegitimate access to or use of the information security device from the VM environment.

3. A Code Transfer Operation

For example, transfer of a user software segment, and a software protection application interface function, etc. The user software segment cannot be read out of the information security device, and can only be executed within the information security device to interact with other external segments through the VM environment, so that the software is legitimately used. Use of the application interface function can open the information security device, establish a communication session, close the information security device and clear device status information, or configure all settings for the information security device through the VM environment, thus implementing all software protection functions through the VM environment. The protected code segment does not go into the VM environment, so that the software is protected from duplicates without permission of the developer.

Step 106: Close the VM environment in the host and disconnect the device upon completion of the user operation.

The VM data file can be encrypted and decrypted to further improve the security in the process. The VM data file can be encrypted with an encryption algorithm in the device before storing the file in the device. The encrypted file can be decrypted with a decryption algorithm relating to the encryption algorithm in the device before loading the VM environment into the host with the VM data file.

For example, the encryption algorithm is DES, 3DES, RC4, RC5, RSA, DSA, or ECC.

To prevent abnormal removal of the device and thus result in that the VM environment cannot be uninstalled completely, start a monitor program in the host, which will automatically unload the VM environment if it detects that the device is directly disconnected with the host while the VM environment has not already been closed (i.e. abnormal removal of the device), after loading the VM environment from the device to the host at Step 103.

Embodiment 2

Figure 2:
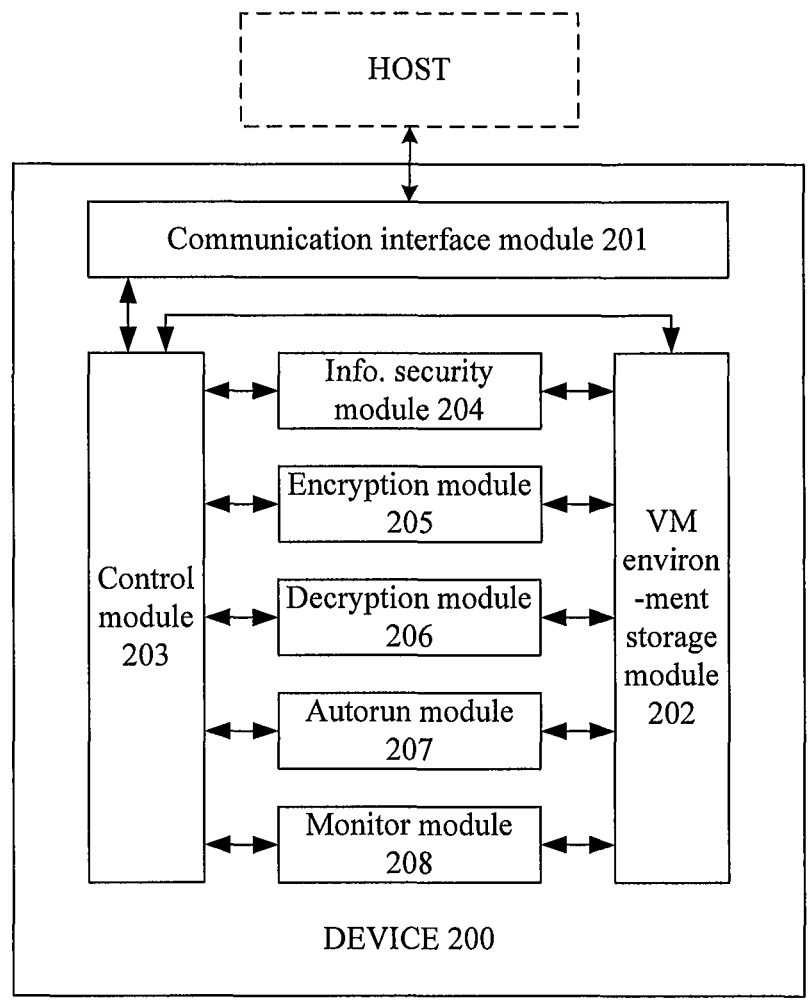
FIG. 2 is a block diagram of a device for virtualizing a personal working environment in Embodiment 2 according to the present invention.

Referring to FIG. 2, the embodiment provides a device 200 for virtualizing a personal working environment. The device comprises the following modules.

1) A communication interface module 201 for connecting the device with a host.

The communication interface module 201 is used to connect the device with a host by parsing the communication protocol between the device and the host. It can be integrated with a control chip, or be on a dedicated communication protocol processing chip. The communication interface can be a wired USB interface, IEEE 1394 interface, or SATA interface, etc. Alternatively, the communication interface can be a wireless interface, such as a wireless Bluetooth interface, an infrared interface, or a RF interface, etc.

2) A Virtual Machine (VM) environment storage module 202 for storing a VM program, a VM data file, data of operations in the virtual working environment. The VM data file contains virtual operating system parameters.

The VM program is used to set a personal working environment. The VM data file is used to store virtual operating system parameters. The VM environment storage module 202 loads a virtual personal working environment from the device to the host using the VM program and virtual operating system parameters in the VM data file and stores data of user operations in the virtual personal working environment in the device. The user operations include the mobile work operations.

The VM environment storage module 202 can be on a mass storage element, such as a mass storage flash chip, an SD card, a micro drive, or a smart card, or can be integrated with a control chip as a storage element (e.g. a security-designed chip with a mass storage unit), whose medium can be one or more of RAM, ROM, EPROM, EEPROM, and flash memory. The mass storage element can be a fixed part of the device, or a removable part.

3) A control module 203 for controlling communications between the communication interface module 201 and the host, and the personal working environment virtualized by the VM environment storage module 202 in the host. It is connected respectively with the communication interface module 201 and the VM environment storage module 202.

The control module 203 can be on a control chip (i.e. a microcontroller chip), or can be integrated with at least one of the communication interface module 201 and the VM environment storage module 202 on a microcontroller chip.

Further, the device 200 for virtualizing a personal working environment can be an information security device, that is, the device 200 can further comprises the following module.

4) An information security module 204 for performing information security operations under control of the control module 203. The information security module 204 is connected with the control module 203.

The information security module 204 manages and controls access to the information security device by a user according to identity information of the user, and performs information security operations both on the host and in the virtual personal working environment. The information security operations in the virtual personal working environment are the same as those described in Embodiment 1.

Upon performing information security operations in the VM environment, the information security module 204 is connected with the VM environment storage module 202. The VM environment storage module 202 can be integrated with the information security module 204 on a mass storage element.

The information security module 204 can be integrated with at least one of the communication interface module 201, the VM environment storage module 202, and the control module 203 on a chip (typically a security-designed chip, e.g. a smart card chip).

To improve the security, the device 200 further comprises the following modules.

5) An encryption module 205 for encrypting the VM data file with an encryption algorithm in the device under control of the control module 203, upon storing the file by the VM environment storage module 202; it is connected respectively with the VM environment storage module 202 and the control module 203; and 6) A decryption module 206 for decrypting the encrypted VM data file with a decryption algorithm relating to the encryption algorithm in the device under control of the control module 203, before virtualizing the personal working environment in the host by the control module 203 and the VM environment storage module 202; it is connected respectively with the VM environment storage module 202 and the control module 203.

In addition, the device 200 can also comprise the following module.

7) An autorun module 207 for automatically loading the VM program and the VM data file stored in the VM environment storage module 202 into the host under control of the control module 203, after the device 200 is connected with the host; it is connected respectively with the VM environment storage module 202 and the control module 203.

At least one of the communication interface module 201, the VM environment storage module 202, and the autorun module can be integrated with the control module 203 on a chip. Or the VM environment storage module 202 can be integrated with the autorun module 207 on a mass storage element.

If the device 200 comprising the autorun module 207 is an information security device, at least one of the communication interface module 201, the VM environment storage module 202, the information security module 204, and the autorun module 207 can be integrated with the control module 203 on a chip. The chip can be a security-designed chip (including a smart card chip). Or, at least one of the information security module 2045 and the autorun module 207 can be integrated with the VM environment storage module 202 on a mass storage element.

To prevent abnormal removal of the device and thus result in that the VM environment cannot be uninstalled completely, the device 200 further comprises the following module.

8) A monitor module 208 for starting a monitor program and automatically unloading the VM environment if it detects that the device 200 is disconnected with the host under control of the control module 203 after virtulization of the personal working environment in the host by the control module 203 and the VM environment storage module 202; it is connected respectively with the VM environment storage module 202 and the control module 203.

The device 200 can be a key ring style, handheld, or wrist portable device. After the user closes the VM environment and removes the device, no personal information is left on the host. In other words, the personal information cannot be obtained by other users from the host.

The mass storage element described in this Embodiment can be a flash memory, a micro drive, a smart card, or an SD card etc.

The VM environment implemented by the device 200 can be a VM environment without any operating systems and applications, or with basic configurations (for example, which are set by the developer). For more information, see description in Embodiment 1.

Figure 3:
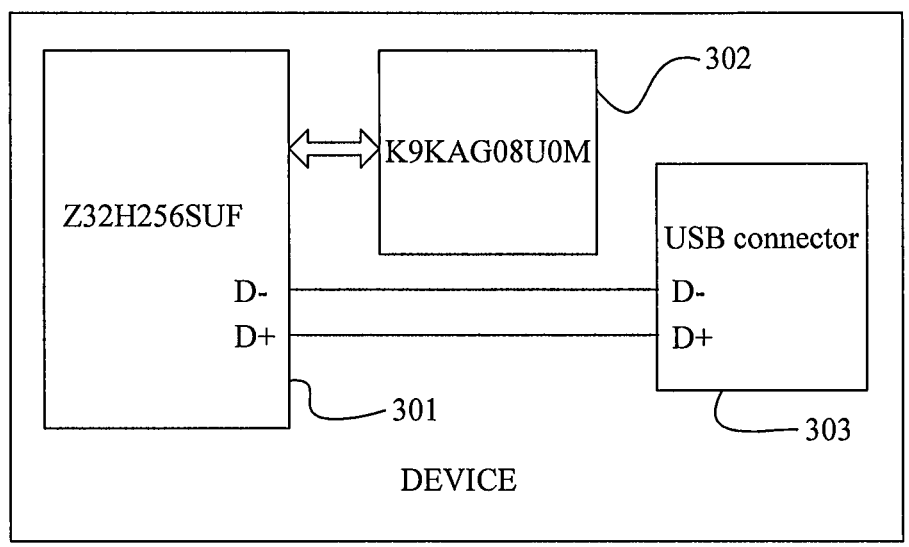
FIG. 3 is a block diagram of a preferred device for virtualizing a personal working environment in Embodiment 2 according to the present invention.

Referring to FIG. 3, a preferred case of the embodiment 3 is to provide a key-ring style portable USB device for virtualizing a personal working environment. The device includes a casing and a circuit board contained in the casing. The core parts of the circuit board are a smart card chip with a USB interface, a mass storage chip, and a USB connector. In this case, the smart card chip is a Z32H256SUF chip 301 from ZTE; the mass storage chip is a K9KAG08U0M chip 302 from SAMSUNG; and the USB connector 303 is also included. The Z32H256SUF chip is used for performing functions of a USB flash disk. The foregoing VM program can be stored on this chip. Also, it can be used for performing functions of an information security device. Therefore, it can also be used to build a USB device for virtualizing a personal working environment with functions of an information security device. The USB connector is adapted to perform communications between the device and a host. The Z32H256SUF chip 301 is used for controlling and managing the operation mode, and processing and managing the data. In addition, the Z32H256SUF chip 301 can provide a 32 KB of EEPROM for storing data and programs, and a 256 KB of flash memory for storing programs, function libraries, and other data that should not be changed frequently. Because the chip uses a non-volatile memory medium, there can be erased repeatedly, it is easy to upgrade the program. At the same time, because the chip is of non-volatile type, it is more secure and reliable to store the program. Pin D+ (the positive end of the USB data line) of the Z32H256SUF chip 301 is connected to pin D+ (the positive end of the USB data line) of the USB connector 303 while pin D− of the chip is connected to pin D− of the connector, so that the Z32H256SUF chip 301 can establish communications with the host through the USB connector 303.

If the device is an information security device, the information security functions are implemented in the Z32H256SUF chip 301, using the encryption and decryption algorithms stored on the K9KAG08U0M chip 302. The mass storage flash K9KAG08U0M chip 302 carrying a VM program and a VM data file is used for setting a VM environment and storing data of user operations in the virtual personal working environment. An autorun program for autorun functions can be stored on either the Z32H256SUF chip 301 or the K9KAG08U0M chip 302. After the information security device is connected with a host, the autorun program can automatically load a VM operating system on the K9KAG08U0M chip 302 into the host. A monitor program can be stored on either the Z32H256SUF chip 301 or the K9KAG08U0M chip 302. Once the VM environment is loaded into the host, the monitor program is started on the host and automatically unloads the VM environment from the host if it detects that the device is disconnected with the host.

As a preferred case, the foregoing communication interface module consists of pins D+ and D− of the Z32H256SUF chip 301 and the USB connector 303. In an embodiment, the communication interface module consists of a separate USB protocol chip (e.g. the PDIUSBD12 chip from PHILIPS) and a USB connector.

The foregoing host can be a desktop, a notebook computer, a server, or a dedicated machine. The foregoing device can also be connected with other external devices, such as a reader, a communications device, a digital camera, a host peripheral, or a dedicated device.

The loaded VM environment in the host is essentially virtualized from the mass storage element of the device. The operations in this virtual operating environment are directed to the virtual space on the mass storage element. Therefore, the operations cannot be traced on the host. If the device is connected with another host, the virtual working environment will be launched again, thus facilitating the mobile work. If the device is an information security device, the information security operations can be applied in the virtual working environment to further improve the security.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the present invention is indicated by the appended claims rather than the foregoing description, and all changes which come within the meaning and range of equivalents thereof are intended to be embraced therein.

The invention claimed is:

1. A method for virtualizing a personal working environment, wherein the method comprises the steps of:
   storing, by a processor, a virtual machine (VM) program on an information security device containing a storage unit;
   storing, by the processor, virtual operating system parameters within a VM data file;
   storing, by the processor, the VM data file on the information security device containing the storage unit;
   connecting, by the processor, the information security device to a host via a data communication interface of the host;
   parsing, by the processor, the stored VM program and the stored VM data file stored in the information security device;
   loading, by the processor, a VM environment into the host in accordance with stored virtual operating system parameters contained in the parsed VM data file and the parsed VM program;
   starting, by the processor, a monitor program in the host;
   determining, by the processor, removal of the information security device from the host, by the monitor program;
   determining, by the processor, that the loaded VM environment has not been closed;
   based on a determination that the information security device has been removed from the host and that the VM environment has not been closed, automatically unloading the VM environment by the monitor program;
   performing, by the processor, information security operations in the information security device by the loaded VM environment;
   wherein the information security operations comprising encryption/decryption of data from an user, authentication information processing operation, or a code transfer operation;
   collecting, by the loaded VM environment, data from the information security operations to the information security device;
   saving, by the processor, the collected data from the information security operations to the information security device, by the VM environment;
   leaving, by the processor, no trial from of the performed information security operations on the host;

closing, by the processor, the loaded VM environment in the host; and disconnecting, by the processor, the information security device from the host.

2. The method for virtualizing a personal working environment according to claim 1, wherein the step of storing the VM program and the VM data file on the device further comprises the steps of:

encrypting the VM data file with an encryption algorithm in the device, and storing the encrypted VM data file in the device; and loading the VM environment into the host further comprises a step of:

decrypting the encrypted VM data file with a decryption algorithm associated with the encryption algorithm in the device and loading the VM environment into the host with the decrypted VM data file.

3. The method for virtualizing a personal working environment according to claim 1, wherein loading the VM environment into the host is conducted through an auto-run function.

4. The method for virtualizing a personal working environment according to claim 1, wherein before loading the VM environment into the host, the method further comprises a step of:

authenticating the user, and allowing the loading process in response to a positive result, or terminating it in response to a negative result.

* * * * *